United States Patent Office 2,892,962
Patented June 30, 1959

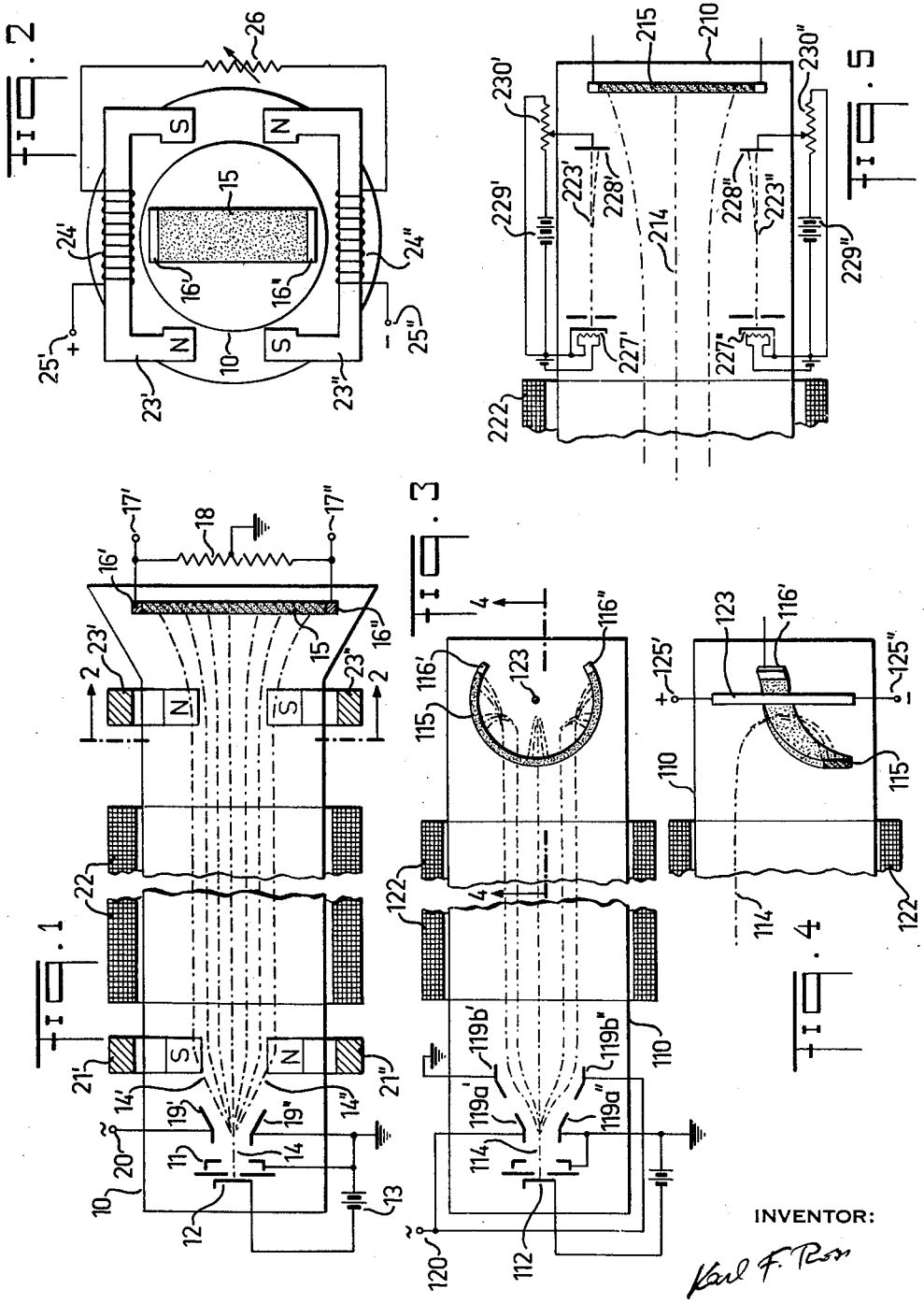

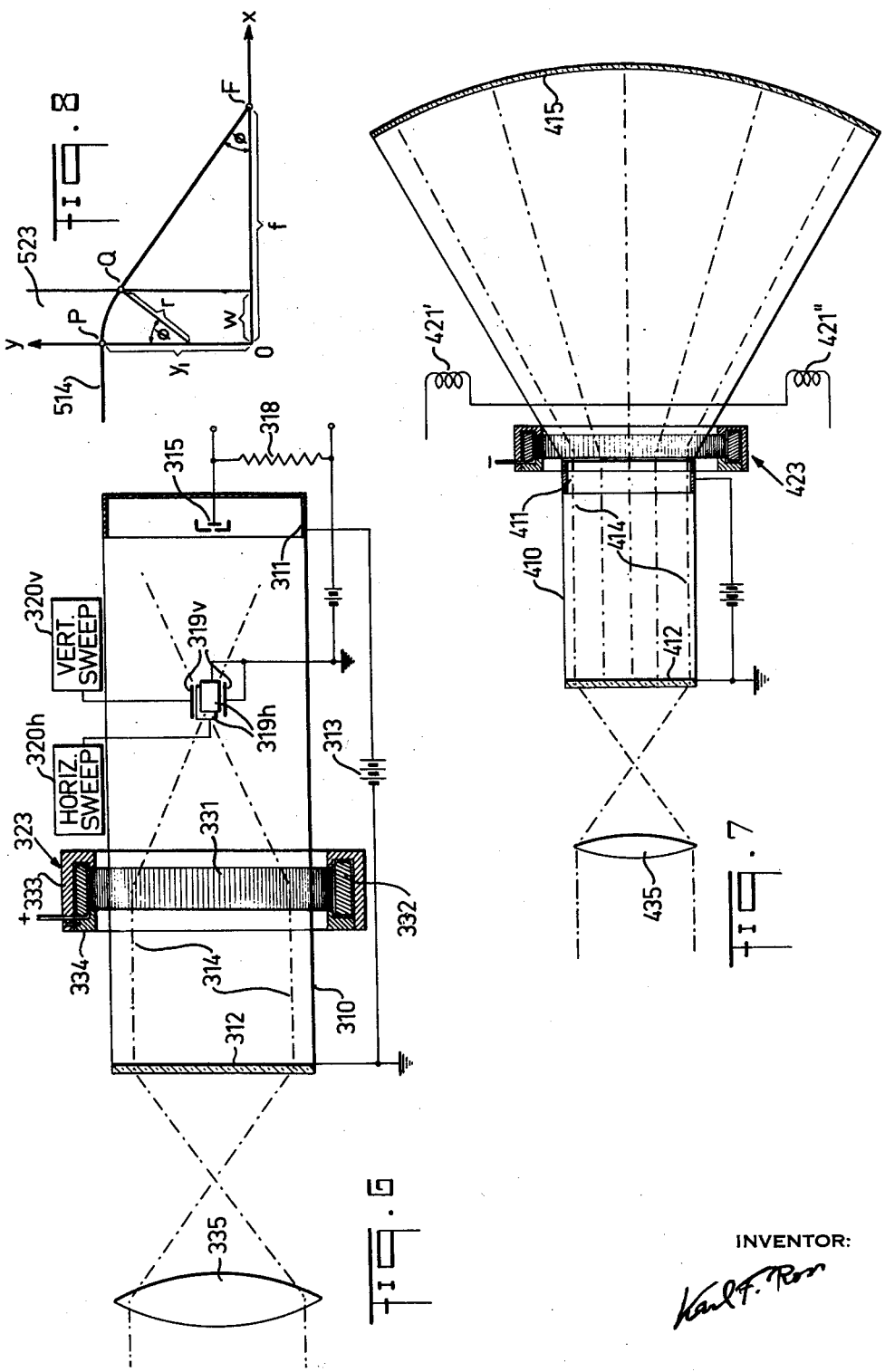

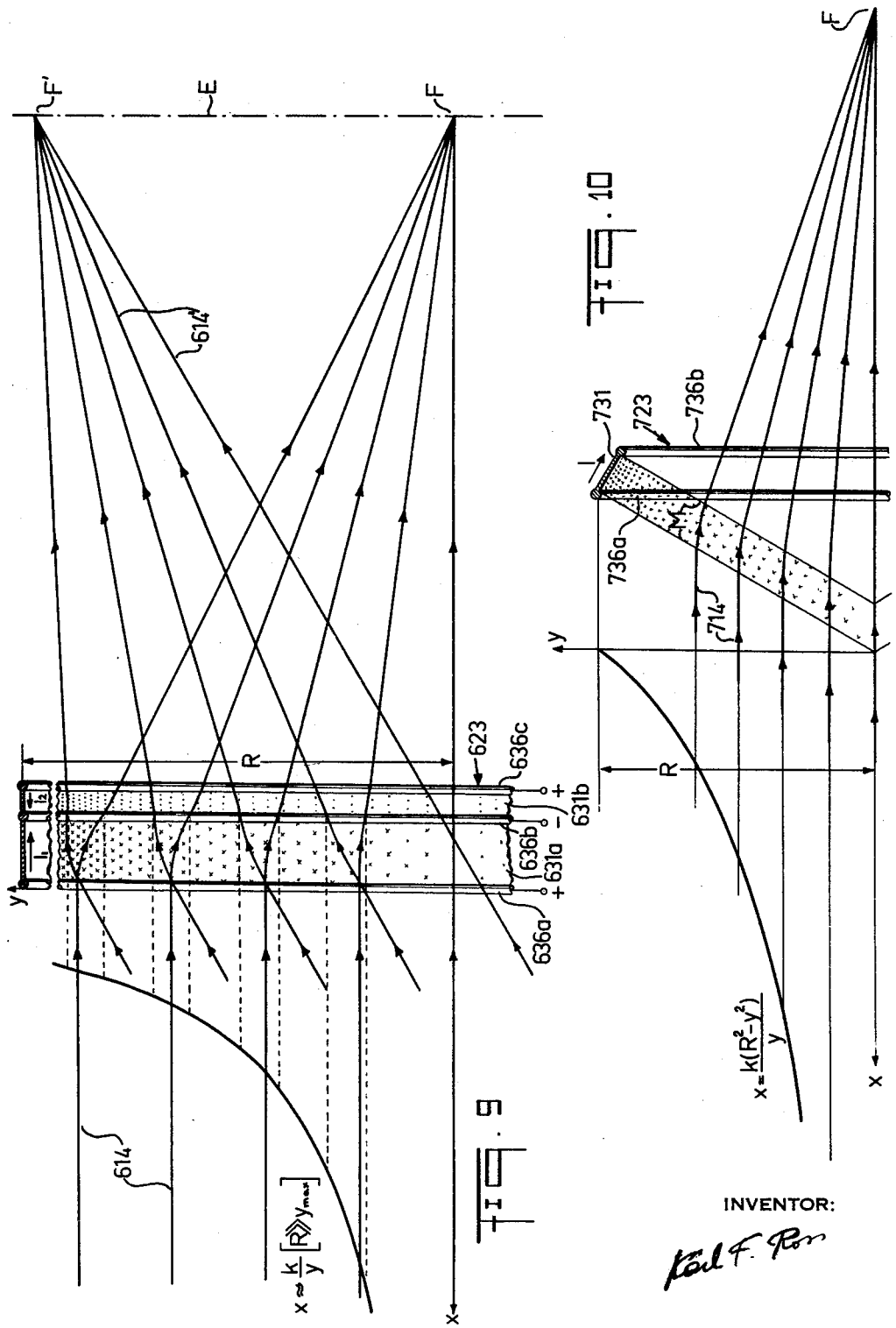

2,892,962

ELECTRONIC LENS SYSTEM

Karl F. Ross, New York, N.Y.

Application October 7, 1955, Serial No. 539,070

6 Claims. (Cl. 315—31)

My present invention relates to a system for controlling the path of electrons moving in space, as in a cathode ray tube.

It is very well known to control either the focusing or the deflection of electron beams by means of fixed or variable magnetic fields which, except for fringe effects, are substantially homogeneous in the region of the electron flow to be controlled. Electrons entering such homogeneous field with a velocity component transverse to the field are deflected onto a path whose locus, until they leave the field, is the periphery of a cylinder having a radus inversely proportional to the intensity of the field. In a non-homogeneous field, on the other hand, the radius of curvature of the electron path changes constantly and its projection upon a plane transverse to the field becomes a complex curve.

The general object of my present invention is to utilize the properties of non-homogeneous magnetic fields to control the movement of electrons in such manner that electrons entering such field at different points will be deflected either toward or away from one another, whereby focusing or defocusing effects analogous to those obtainable with optical lens systems may be produced.

A more specific object of this invention is to provide an electron-optical lens whose refractive power can be readily varied in both magnitude and sign, whereby an entire electronic objective system may be built up from several structurally similar lens elements.

Broadly speaking, a system according to my invention comprises means for directing electrons, either simultaneously or at different times, over a plurality of paths extending in the same general direction and located within a zone hereinafter referred to as the beam zone; and it further comprises means for setting up a non-homogeneous magnetic field across the beam zone whose intensity transverse to the general direction of the electrons varies progressively throughout the entire zone or at least a substantial portion thereof. In many instances it will be desirable to produce a symmetrical field reaching an extreme value at the center of the zone; if this value is zero, the field intensity may change sign at such center.

A magnetic field of the character set forth may conveniently be produced by means of an annular conductor traversed in axial direction by a current whose intensity is uniform through out the periphery of the conductor. The magnetic lines of force within such conductor form concentric circles and their density increases with their radius, i.e. the field strength is a maximum at the inner periphery of the conductor and falls to zero toward its axis. If the axial width of the annular conductor is small, electrons traversing it in axial or near-axial direction will have such a short trajectory within the magnetic field that their path can be regarded as two straight lines joined by a short arc of a circle whose radius is inversely proportional to the distance of the electron from the conductor axis; the conductor then becomes the equivalent of a thin optical lens since for a limited beam spread, giving rise to small angles of deflection for the electrons remotest from the axis, the outgoing electron paths will converge on either a real focus (back of the conductor) or on a virtual focus (ahead of the conductor), depending on the polarity of the electric current. Since the radius of curvature of an electron path in a magnetic field varies also as the square root of the velocity of an oncoming electron, the electron-optical lens element thus obtained will have different foci for different electron velocities, a property which may be termed "chromatic aberration" by analogy with photo-optics. A plurality of collective and/or dispersive lens elements may, however, be combined into objectives corrected for this and other aberrations and having a favorable aperture ratio, definable as the ratio of maximum permissible beam width to focal length.

The invention will be more fully described with reference to the accompanying drawing in which:

Fig. 1 shows, somewhat diagrammatically, a cathode ray tube embodying the invention adapted to serve as a signal delay device;

Fig. 2 is a section taken on the line 2—2 of Fig. 1;

Fig. 3 is a view similar to Fig. 1, showing a modified delay device embodying the invention;

Fig. 4 is a section taken on the line 4—4 of Fig. 3;

Fig. 5 is a view similar to the right-hand portion of Fig. 1, illustrating a further modification;

Fig. 6 shows, again somewhat diagrammatically, a television pickup tube of the image orthicon type comprising a lens element according to the invention;

Fig. 7 is a view similar to Fig. 6, showing an electronic image amplifier having a lens element similar to that of Fig. 6;

Fig. 8 is a graph serving to explain the focusing action of an electron-optical lens according to the invention as shown in Figs. 6 and 7;

Fig. 9 diagrammatically illustrates the focusing action of a compound electron-optical lens according to the invention; and Fig. 10 is a diagrammatic view similar to Fig. 9, showing the focusing action of a modified electron-optical lens of the general type shown in Figs. 6 and 7.

In Figs. 1 and 2 I have shown a cathode ray tube 10 whose evacuated cylindrical envelope contains an electron gun including an accelerating anode 11 biased positively, relative to a cathode 12, by means of a battery 13. This gun emits an electron beam 14 toward a target electrode consisting of a body 15 of resistance material bounded by a pair of conductive terminal strips 16', 16", the latter being tied to respective output terminals 17', 17" connected across an output resistor 18 with grounded center tap. Since the anode 11 is likewise grounded, the region between it and target electrode 15 represents a drift space in which the electrons of beam 14 undergo substantially no further acceleration.

A pair of deflecting electrodes 19', 19", connected between ground and a signal input terminal 20, serve to deflect the beam 14 from the tube axis into a variety of positions of which some, including the extreme beam positions 14' and 14", have been indicated in dot-dash lines in Fig. 1. The beam then passes between a pair of horseshoe magnets 21', 21", which may be of the permanent type, positioned on either side of the tube axis with relatively inverted polarity so as to produce a field which has a maximum intensity of one sign in the region of beam position 14', goes through zero at the tube axis and has a maximum intensity of the opposite sign in the region of beam position 14".

With proper selection of the dimensions, magnetic intensity and relative spacing of magnets 21', 21" it is possible to obtain a field whose strength in the median plane of tube 10 varies nearly linearly with the distance from the tube axis whereby, with suitable choice of polarity as indicated on the drawing, the electron beam deflected by electrodes 19', 19" will again be deflected into a substantially axial position irrespectively of the original angle of deflection. The thus re-oriented beam enters the axially extending magnetic field of a conventional focusing coil 22 serving to prevent the electrons from straying from their axially directed path. The length of this part of tube 10 is assumed to be such that the transit time of the electrons between input electrodes 19', 19" and output electrode 15 is equal to at least a substantial fraction of a cycle of the high-frequency signal fed in at terminal 20 whereby a desired degree of delay will be obtained.

Since the distance of the electron beam from the tube axis in the region of coil 22 will be a function of the input voltage applied across deflecting electrodes 19', 19", a useful output could be obtained with target electrode 15 positioned immediately at the end of this coil or even within the magnetic field thereof. In accordance with another feature of the invention, however, I prefer to provide a second pair of horseshoe magnets 23', 23" between coil 22 and target 15, the polarity of these magnets being opposite to that of magnets 21', 21" whereby the beam will be deflected outwardly, by an angle at least roughly proportional to the spacing of the beam from the tube axis, so that the loci of impingement of the electrons upon target 15 will be spread further apart and a larger target electrode, with improved signal-to-noise ratio, can be used.

The amplitude of the delayed output signal at terminals 17', 17" may be varied, according to another feature of the invention, by modifying the extent of the deflection of the beam under the control of magnets 23', 23". For this purpose I have shown each of these magnets provided with an energizing winding 24', 24", respectively, connected across a source of current (not shown) by way of terminals 25', 25" in series with an adjustable impedance indicated schematically at 26.

Figs. 3 and 4 show a device somewhat similar to that of Figs. 1 and 2, comprising a tube 110 from whose cathode 112 emanates a beam 114. The position of this beam is controlled by two pairs of deflecting electrodes 119a', 119a" and 119b', 119b" which are cross-connected between ground and a signal input terminal 120 in such manner as to maintain the deflected beam parallel to the axis of the tube, as disclosed in my co-pending application Ser. No. 155,205, filed April 11, 1950, now Pat. No. 2,728,854 issued December 27, 1955.

The elongated central portion of the tube is surrounded by a focusing coil 122.

The output end of tube 110 comprises an elongated conductor 123 positioned at right angles to the tube axis and energized from a source of direct current (not shown) via terminals 125', 125"; the intensity of this current may be controlled by suitable means such as the variable impedance 26 of Fig. 2. Conductor 123 is surrounded by a cylindrical, non-homogeneous magnetic field whose strength perpendicular to the median plane defined by the conductor and the beam axis, which is transverse to the plane of deflection of beam 114, is a maximum in said median plane and tapers off rather sharply on either side thereof, both because of the increasing distance from conductor 123 and by reason of the smaller angle enclosed between the circular lines of magnetic force and the beam. When the beam 114 is undeflected by a signal applied to terminal 120, the increasing magnetic field in the neighborhood of conductor 123 forces the electrons onto a path of progressively decreasing radius of curvature, as shown in Fig. 4, until they reach a point closest to conductor 123 after which they are deflected away from this conductor over a path symmetrical to the path of approach. If the beam has been originally skew to conductor 123, its magnetic deflection parallel to this conductor will be reduced and the electron path will be curved away from the median plane previously defined. A target electrode 115 of resistance material, provided with conductive terminal members 116', 116" from which connections extend to an output circuit not further illustrated which may be similar to that of Fig. 1, is in the form of a strip concentric with conductor 123; strip 115 extends along a space curve in such manner as to intercept the electrons deflected by the magnetic field around conductor 123 in various positions of the beam.

From Fig. 3 it will be apparent that the point of impingement of the electrons upon target 115 shifts considerably with relatively small deviations of the beam position from the tube axis, this sensitivity, on the other hand, may result in a certain dispersion of the electrons at the target, as illustrated, especially in the case of beams of appreciable cross section. Since, however, the voltage appearing across terminals 116', 116", will be determined by the mean locus of impingement of the intercepted electrons, the output signal will not be materially affected by this dispersion.

A magnetic field similar to that existing around conductor 123 may also be produced by a stream of free electrons. This has been illustrated in Fig. 5 where, by way of further modification, two electron currents 223', 223" parallel to a controlled beam 214 are generated by respective cathodes 227', 227", anodes 228', 228" and biasing batteries 229', 229". Beam 214, after passing along or parallel to the axis of tube 210 through the field of a focusing coil 222, reaches a target electrode 215 after passing through a magnetic field which is zero along the tube axis and reaches maxima of opposite sign adjacent electron currents 223' and 223", being thus similar to the field produced by magnets 23' and 23" in Fig. 1. It may be mentioned that, as illustrated, the presence of beam 214 will also tend to deflect the electron currents 223', 223" from their path parallel to the tube axis; such deflection may, however, be minimized by imparting a sufficiently high velocity to the electrons emitted by cathodes 227', 227". This velocity may be controlled, for the purpose of varying the degree of deflection of beam 214, by means of potentiometers 230', 230".

The region extending between the extreme beam positions 14', 14" in Fig. 1, and between corresponding beam positions in Figs. 3 and 5, has been defined above as the beam zone. The width of this zone may be termed the beam spread, and it will be observed that the action of the magnetic deflecting means 23', 123, 223' etc. is to enlarge this beam spread near the output end of the tube. If the polarity of magnets 23', 23" or the direction of electron currents 223', 223" were reversed, the result would be a contraction rather than an expansion of the beam spread. It will be understood, furthermore, that this dispersive or collective action of the non-homogeneous magnetic field will be the same whether the electrons travel over their several possible paths within the beam zone successively, as hereinbefore described, or simultaneously, as shown in the following embodiments.

Whereas in the preceding figures the beam zone has been limited to one plane, I have shown in Figs. 6 and 7 a centrally symmetrical magnetic lens element adapted to control an electron beam in two dimensions. The element 323 in Fig. 6 comprises a toroidal winding 331 wound around a core 332 and encased in a two-part shell 333, 334 having flanges which leave only an annular portion of the inner periphery of winding 331 exposed. Members 332, 333, 334 are of ferromagnetic material and serve to shield the remainder of the winding so that only the exposed portion is effective to produce a magnetic field composed of concentric lines of force whose concentration diminishes to zero at the center of lens element 323.

Winding 331 is traversed by direct current from a suitable source, not shown, with a polarity opposite to that of electron currents 223', 223" in Fig. 5, whereby a beam passing parallel to the axis of a tube 310 within the field of element 323 is deflected toward this axis. Tube 310 is provided with a photocathode 312 upon which an optical image is projected by means represented schematically by a lens 335. A metallic coating 311 at the opposite end of the tube is positive biased, relatively to cathode 312, by a battery 313 so as to act as an anode imparting an axial acceleration to a stream of electrons 314 emitted by the cathode. This electron stream 314, whose density throughout its cross section is controlled by the intensity of the light projected upon photocathode 312, is focused by lens element 323 into a cone at whose apex there are provided electrostatic deflecting means in the form of a pair of electrodes 319h connected across a "horizontal" sweep voltage generator 320h and a pair of electrodes 319v similarly connected across a "vertical" sweep voltage generator 320v. Positioned beyond the deflectors 319h, 319v, in the divergent branch of the double electronic cone, is a collector anode 315 of small cross section which is connected to positive potential by way of an output resistor 318. The voltage developed across this resistor varies with the intensity of the electron stream 314 as the latter is caused to scan the anode 315 under the control of sweep circuits 320h, 320v. It will be apparent that the positioning of the deflecting electrodes 319h, 319v adjacent the narrowest point of a roughly conical or pyramidal electron stream enables the use of considerably weaker electrostatic fields than would be required for the control of a prismatic or cylindrical electron stream.

In Fig. 7 I have shown a tube 410 whose photocathode 412, illuminated by means of an optical system illustrated as a lens 435, emits an electron stream 414 accelerated by an annular anode 411. A magnetic lens element 423, surrounding the tube 410, is similar to element 323 of Fig. 6 but is energized with current of opposite polarity so as to cause the electron stream to diverge. This divergent stream impinges upon a fluorescent coating 415 on which there is thus produced an enlarged replica of the image projected upon cathode 411. The degree of enlargement can be readily varied by controlling the current through the winding of element 423, e.g. by such means as the impedance 26 of Fig. 2. If the enlargement exceeds the dimensions of the fluorescent screen 415, any desired part of the image may be brought into view with the aid of suitable deflecting means such as, for example, a pair of electromagnetic coils 421', 421" and similar coils, not shown, positioned at right angles thereto.

The tangential intensity of the magnetic field at any point within a lens element of the type shown in Figs. 6 and 7 may be considered, in first approximation, as proportional to $y/(R^2-y^2)$ where R is the radius of the element and $y$ is the distance of such point from the lens axis. In the region around this axis, where $y$ is much smaller than R, we may write $H=Ky$, H being the field strength and K being a proportionality factor depending upon the magnitude of the energizing current. Reference is made to Fig. 8 for an explanation of the focusing action of a magnetic field for which the last-mentioned relationship is substantially true.

In Fig. 8 there has been shown an electron beam 514, parallel to the abscissa of a co-ordinate system $x$, $y$, entering a magnetic field 523 whose width along the abscissa is $w$. Beam 514 crosses the axis $y$, representing the left-hand edge of field 523, at a point P whose ordinate has the value $y_1$. According to the assumption made above, the magnetic field at point P has an intensity equal to $Ky_1$ and thus deflects the beam along an arc whose initial radius of curvature $r=K/y_1$. If width $w$ is small compared to $r$, then we can assume that radius $r$ remains approximately constant until the beam leaves the field 522 at a point Q. Continuing tangentially at the latter point, beam 514 finally intersects the abscissa $x$ at a point F.

If the arc of radius $r$ traversed by the beam subtends an angle $\phi$, then straight line Q—F will enclose a like angle with the abscissa $x$. This angle is determined from the relationship $\sin \phi = w/r = wy_1/k$. With proper choice of the exciting current the constant $k$ will be large and $\phi$ will be small enough to permit equating the sine with the tangent, whereby $\tan \phi = y_1/f \approx wy_1/k$ whence $f=k/w$, $f$ being the focal distance between origin O and point F (assumed to be large with respect to $w$). It will thus be seen that, with the approximations stated above, the focal length of the lens will be independent of the distance $y$ of the incident beam from the lens axis within a limited cylindrical zone around such axis.

In Figs. 9 and 10 I have illustrated several ways of improving the focusing action of a magnetic lens of the general type shown in Figs. 6 and 7. Fig. 9 schematically shows an annular lens element 623 comprising three highly conductive rings 636a, 636b, 636c joined together by annular webs 631a, 631b of somewhat reduced thickness. Outer rings 636a, 636b are connected to positive potential whereby currents $I_1$, $I_2$ will flow in webs 631a, 631b toward inner ring 636c, connected to negative potential, as indicated in the drawing. The relative dimensioning of rings 636a, 636b, 636c and webs 631a, 631b is designed to insure a substantially uniform current distribution throughout the periphery of element 623 by providing a slight rise in resistance at the junctions between the rings and the webs.

The abscissa $x$ of the co-ordinate system in Fig. 9 coincides with the axis of lens element 623 whose left-hand edge coincides with the ordinate $y$. It is assumed that the maximum distance $y_{max}$ of the incident electron beams 614 from the axis is a small fraction of the radius R of element 623, whereby the radii of curvature of the electron paths within the beam zone will be approximately the function $x=k/y$ plotted in the left-hand portion of Fig. 9.

Since the currents in webs 631a and 631b flow in opposite directions, the trajectory of the electrons will have an inversion point as it traverses the plane of central distributor ring 631b representing the junction between a collective and a dispersive lens component. The electron paths from beams 614 will converge at a focal point F on the axis $x$. Furthermore, beams 614' impinging at an angle to the lens axis will also be caused to converge, their focal point being at F' which with focus F lies in a focal plane E perpendicular to the lens axis. It will thus be seen that, with proper dimensioning, a compound magnetic lens can be produced by the present invention adapted to focus electron rays in substantially the same manner as light rays are focused by optical lenses.

Fig. 10 shows a lens element 723 comprising a pair of distributor rings 736a, 736b spanned by a web 732 which is conical rather than cylindrical as in the preceding embodiment, the current I therein thus producing a magnetic field M of beveled configuration. Since the radius R of lens 723 is only slightly larger than that of the zone occupied by electron beams 714, the radii of curvature of the beam paths within the field M is here given approximately by the function $x=k(R^2-y^2)/y$ as plotted in the left-hand portion of Fig. 10. The beams will be seen to converge at a focus F on the axis $x$.

It will be understood that the lens elements 623 and 723 may be provided with marginal shields of the character illustrated in Figs. 6 and 7, and that more generally they are also representative of toroidal coils as shown in these latter figures while conversely the elements 323 and 423 may be of compound and/or beveled (or curved) form, similar to elements 623, 723 or a combination thereof. Furthermore, the principles herein disclosed are applicable to charged particles other than electrons, such as ions.

The invention is, accordingly, not limited to the specific embodiments described and illustrated but may be realized in various modifications, substitutions (e.g. of an electron beam similar to beam 223' for conductor 123), adaptations or combinations without departing from the spirit and scope of the appended claims.

I claim:

1. An electronic device comprising an evacuated envelope, a source of electrons in said envelope, means for directing said electrons over a plurality of generally parallel paths defining a beam zone, and focusing means for deflecting said electrons in a manner causing substantial convergence of said paths at a single point, said focusing means comprising annular conductor means surrounding said beam zone and a source of direct current connected to said conductor means, said conductor means forming a substantially uniform path all around an axis of said beam zone for passing said current in generally axial direction, thereby establishing in a plane transverse to said axis a steady annular magnetic field which varies progressively in radial direction but is of substantially constant intensity at a given distance from said axis.

2. The combination according to claim 1, wherein said conductor means is divided into a plurality of axially adjoining sections, said source being arranged to pass current in opposite directions through adjacent ones of said sections.

3. The combination according to claim 1, wherein said conductor means comprises a toroidal coil.

4. The combination according to claim 3, further comprising ferromagnetic shield means within said coil.

5. The combination according to claim 1, further comprising ferromagnetic shield means adjacent the edges of said conductor means.

6. An electronic device comprising an evacuated envelope, a source of electrons in said envelope, means for forming said electrons into a beam composed of a plurality of generally parallel electron paths, focusing means for deflecting said electrons in a manner causing substantial convergence of said paths at a single point, and deflecting means for said beam positioned adjacent said point; said focusing means comprising annular conductor means surrounding the beam and a source of direct current connected to said conductor means, said conductor means forming a substantially uniform path all around the beam axis for passing said current in generally axial direction, thereby establishing in a plane transverse to said axis a steady annular magnetic field which varies progressively in radial direction but is of substantially constant intensity at a given distance from said axis.

References Cited in the file of this patent

UNITED STATES PATENTS

| | | |
|---|---|---|
| 2,172,728 | Bruche | Sept. 12, 1939 |
| 2,178,093 | Zworykin et al. | Oct. 31, 1939 |
| 2,294,123 | Miller et al. | Aug. 25, 1942 |
| 2,299,792 | Bouwers et al. | Oct. 27, 1942 |
| 2,314,409 | Knoop | Mar. 23, 1943 |
| 2,467,009 | Bull et al. | Apr. 12, 1949 |
| 2,680,204 | Swedlund | June 1, 1954 |
| 2,803,770 | Harkensee | Aug. 20, 1957 |

FOREIGN PATENTS

| | | |
|---|---|---|
| 1,020,193 | France | Nov. 12, 1952 |
| 1,063,743 | France | Dec. 16, 1953 |